United States Patent Office 3,472,738
Patented Oct. 14, 1969

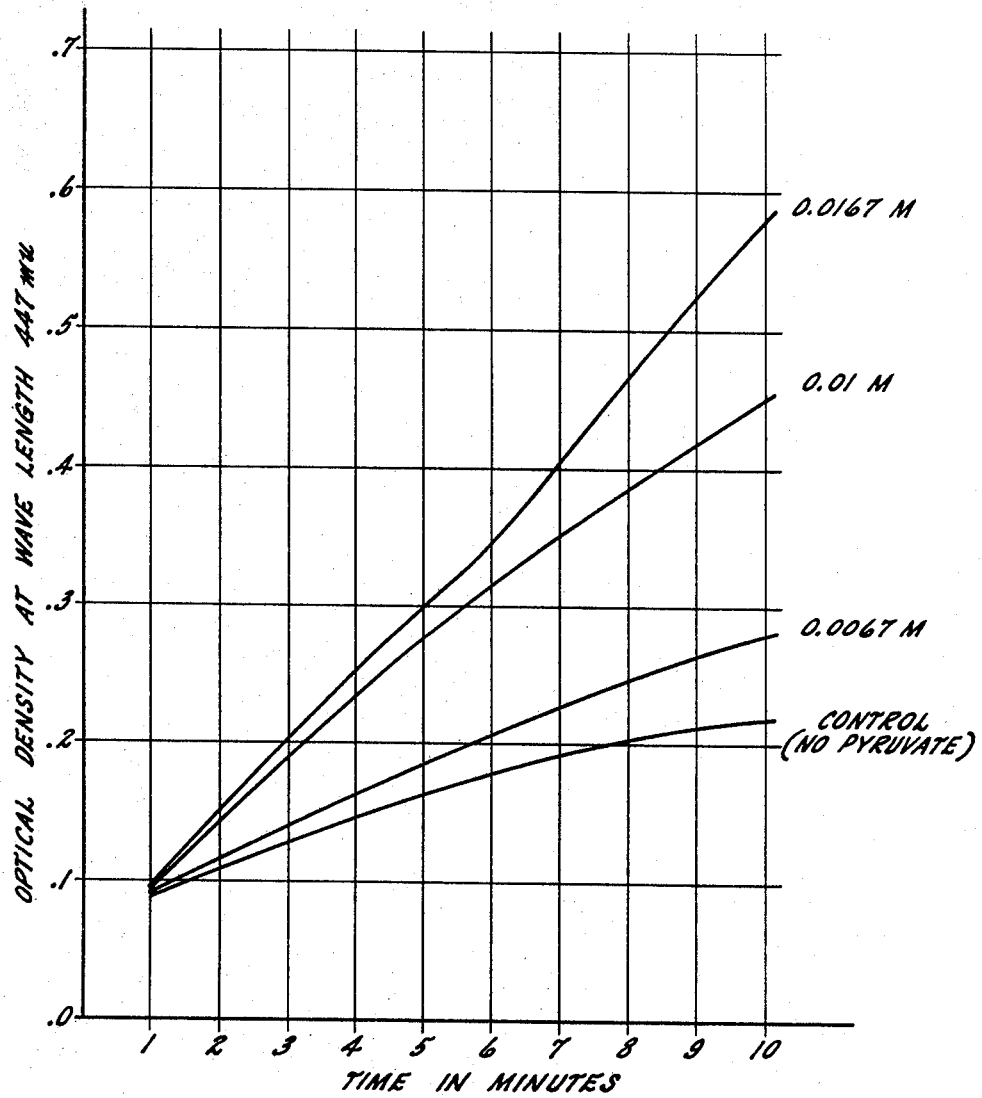

3,472,738
TEST IMPLEMENT FOR DETECTING PEROXIDASE
Raymond O. Foster, Joliet, Ill., assignor to Weston Laboratories, Inc., Ottawa, Ill., a corporation of Illinois
Filed June 12, 1967, Ser. No. 645,246
Int. Cl. C12k 1/04; G01n 31/14
U.S. Cl. 195—99                          2 Claims

ABSTRACT OF THE DISCLOSURE

An improved test implement which makes possible a simple and accurate oral test for detection of the fertile period in the female species. A test tape is impregnated with a peroxide, an indicator (guaiaconic acid), and sodium pyruvate. On contact with saliva which contains the enzyme peroxidase in relatively high concentration (i.e., just prior to ovulation and during the fertile period), the test tape turns blue. The use of sodium pyruvate in this test tape greatly enhances the color formation and therefore the reliability of the test.

BACKGROUND OF THE INVENTION

This invention relates to an improved and novel analytical test implement useful in detecting an increase in certain enzyme activity (peroxidase), which is coincident with the fertile period of the female, and to a novel method for detecting the said increase in enzyme activity and thereby the fertile period.

It has been proposed in the past to analyze for the presence of the enzyme peroxidase in the saliva of the human female. The test and analysis is considered to be important and useful because the concentration of peroxidase in saliva has been found to vary during the menstrual cycle and to reach a peak just prior to ovulation.

The importance of being able to detect the time when ovulation is about to take place in the human female is readily apparent, both to those who wish to take advantage of the fertile period and those who wish to avoid it. Much effort has been expended in attempts to calculate the fertile period by reference to the onset of menses and by recording temperatures, and the like. The former method is beset with inaccuracy because the human female may ovulate at varying and unpredictable times. On the other hand, mechanical methods such as taking and recording temperatures are distinctly inconvenient and may require considerable skill in observing and interpreting the data. Hence, the finding that the onset of ovulation was coordinated with a high level of peroxidase activity in the saliva was greeted with much interest. Method and means were worked out to test for this increased activity, and a certain amount of success was achieved. In many instances it was possible through the use of a test implement (a test tape) which would develop a recognizable color in the presence of higher levels of peroxidase in the saliva, to obtain good correlation between this test and the previous standard, namely, basal body temperature (thermal shift response). Unfortunately, however, the test did not work with equal reliability in all subjects. The degree of color response varied from individual to individual and, while the previous tape was definitely useful for many subjects, it required preliminary testing and careful evaluation by the individual before full reliance could be had on the test.

In accordance with the present invention I have now found a test tape and method which is far more reliable in detecting the presence and the amount of peroxidase in the saliva, and a test implement which is characterized by a marked change in color which is easily observed even by the unskilled observer and which is uniform for substantially all subjects.

In accordance with the present invention there is now provided a test implement useful in detecting the level of peroxidase in saliva and therefore the fertile period of the female which comprises a bibulous material impregnated with the following as the essential ingredients: (a) sodium pyruvate, (b) a mannitol-peroxide complex, and (c) an organic compound which forms a colored oxidation product in the presence of oxygen released from peroxide. A representative formula useful in making up the test implement is given hereinafter.

While I do not wish to be bound by any theory because the subject matter is in a field about which very little is known at the present time, I believe the invention can be explained along the following lines. In saliva there is present a substance called peroxidase, an enzyme. The concentration of peroxidase in saliva varies from time to time and from individual to individual, and in the human female the concentration of peroxidase becomes greater just prior to ovulation. Hence, it is possible to determine the onset of ovulation by determining the relative amount of peroxidase in saliva.

There is, however, also present in saliva a substance known as DPNH (diphosphopyridine nucleotide—reduced), which has an inhibiting effect on the ability of peroxidase to release oxygen from a peroxide. The amount of DPNH in the saliva likewise varies rather widely and this makes it virtually impossible to interpret the effect on activity of peroxidase.

There is still another substance normally present in saliva, namely, lacticdehydrogenase (LDH), and it activates the following reaction:

However, I have now found in this invention that the addition of sodium pyruvate forces the reaction in the direction of the formation of sodium lactate and DPN (diphosphopyridine nucleotide) as follows:

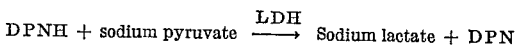

DPN does not inhibit the activity of peroxidase whereas DPNH does. Hence, the addition of sodium pyruvate to the reaction mixture effectively removes the inhibiting substance DPNH in favor of a noninhibiting substance, DPN.

The accompanying figure illustrates graphically the effect of the addition of sodium pyruvate on the degree of color formation in an indicator system of the type described herein. More specifically the figure shows the effect of the addition of sodium pyruvate on the degree of color formed in the reaction whereby salivary peroxidase releases oxygen from a peroxide, and the oxygen oxidizes a color forming indicator (guaiaconic acid). As will be seen in the figure the control solution which contains no sodium pyruvate develops an optical density of 0.08 in one minute after the reactants are brought together. The salivary peroxidase continues to release oxygen from a source of peroxide and this oxygen further oxidizes the guaiaconic acid as the time period progresses from one minute to ten minutes. The intensity of color, as evidenced by the optical density, becomes progressively stronger but at a slow rate. At the end of ten minutes the optical density has increased to only slightly above 0.2. While this amount of color may be satisfactory in some cases, it fails to provide the high degree of reliability and the development of a deep color that is so important to the unskilled observer.

On the other hand, as shown in the figure, when 0.01 mol of sodium pyruvate is added to the reaction mixture the intensity of color is sharply enhanced with the passage of time, and at the end of ten minutes of development, the color as measured by the optical density will have reached 0.45, or more than twice that of the control solution. This doubling of the color response provides the ease of observation and the reliability that is desired for the unskilled observer.

Even better response can be obtained by adding more sodium pyruvate. As shown in the figure, when 0.0167 mol of sodium pyruvate is added to the reaction mixture the optical density at ten minutes will have risen to approximately 0.6 or almost three times that of the control. The degree of color formation is quite marked in that it has increased from an optical density of 0.1 at one minute to almost 0.6 at ten minutes. Such a marked color development provides a high degree of reliability and is easily seen even by the uninitiated observer.

The saliva employed as the liquid medium in the tests illustrated in the figure contains not only the naturally occurring peroxidase but also the naturally occurring DPNH. As shown in the control test the DPNH exhibited a suppressing effect on the color forming reaction between the peroxidase, peroxide and guaiaconic acid. The addition of sodium pyruvate inhibited the effect of the DPNH and enabled the true color response of the peroxidase, peroxide and indicator system to be realized.

The solutions of the type employed in the tests illustrated in the figure are made up in accordance with the following directions:

Reagents

Guaiacol—Merck N.F. or guaiaconic acid—2 ml., diluted to 500 ml. with distilled water—0.358 M stock solution Hydrogen peroxide—3% stock solution Phosphate buffer—sodium monobasic phosphate, sodium phosphate dibasic 0.2 M pH–7.4

Sodium pyruvate—Sigma chemical type II—0.1 M stock solution—aqueous

Saliva—Centrifuged whole supernatant at 4500 r.p.m.

Method

In a 3.5 ml. silica cuvette, the following were mixed: 0.3 ml. of saliva supernatant, 1.2 ml. of buffer, 1.0 ml. of stock solution of guaiacol, and 0.5 ml. distilled water. A reference cuvette was made containing all of the reagents listed above. One drop of water was added to the reference cuvette. At zero time, 0.05 ml. or 3% hydrogen peroxide was added to the sample cuvette. The reaction was followed at one minute intervals for ten minutes at 447 mu.

The above assay was repeated with the exception of substituting sodium pyruvate in place of the water so that the final concentration was 0.0067 M, 0.01 M, and 0.0167 M, respectively.

Turning now in more detail to the test implement or test paper contemplated by this invention, a full description of one preferred embodiment will be given. The test paper is preferably an absorbent paper, for example, an absorbent and chemically pure grade of filter paper or the like. Cloth strips or porous and absorbent wood strips may also be employed. The test paper is impregnated with a solution of the active ingredient and is then subjected to drying to evaporate the solvent and leave the active ingredients of the paper.

In one representative formula 3.45 grams of Methocel, a methylcellulose product, is dissolved in 220 cc. of distilled water, and 50 cc. of ethyl alcohol and 50 cc. of propyl alcohol are added to the solution. A second solution is made up by dissolving 15 grams of mannitol in 100 cc. or 3% hydrogen peroxide.

A third solution is prepared which contains 3.75 grams of Tween 80 (a polyoxyethylene derivative of sorbitan), dissolved in 60 cc. or ethyl alcohol. 1.8 grams of guaiaconic acid (highly purified) is likewise dissolved in the ethyl alcohol. A fourth solution is prepared by dissolving 5.0 grams of sodium citrate, 50 milligrams of citric acid and 2.50 grams of sodium pyruvate in 60 cc. of distilled water. The amount of sodium pyruvate may be varied but it should be sufficient to enhance the formation of color by the indicator system. As shown in the figure the amount of sodium pyruvate should be sufficient to result in a concentration of at least 0.005 M in the saliva on test.

The above-named four solutions are combined (the combined solution having a pH. of 6.6), and large sheets of chemically pure filter paper are impregnated with the mixed solution and thereafter air dried.

The test paper or test tape so prepared was used in clinical studies to determine the accuracy of said test tape in detecting the fertility period in the female, as evidenced by changes in the saliva. When compared to the previous standards, namely, the basal body temperature (thermal shift response), the foregoing test tapes were found to have a highly reliable correlation. The great advantage and convenience of this oral test is at once apparent. The female simply touches the test paper to her tongue to wet it and waits a few minutes to see if a color change develops on the test paper. The result is easily observed and does not require the recording and interpretation of data over a long period of time. Each test is complete per se. The test is reliable and simple as well as being convenient and relatively inexpensive. When the peroxidase level in the saliva is high, i.e., when ovulation is about to take place, the test tape of this invention develops a readily observable blue color. On the other hand, in the nonfertile part of the cycle when the peroxidase level is low, the test tape does not change color on contact with saliva or the color development is of such a low order that it is easy for the observer to tell the difference between the fertile period and the nonfertile period.

Hydrogen peroxide is known to be unstable under the conditions normally associated with the preparation and use of the test implement described herein. It is therefore unusual and highly useful to find that the complex of hydrogen peroxide with mannitol is stable and efficacious in this medium. Other stable, orally nontoxic organic complexes of hydrogen peroxide which are capable of releasing oxygen on contact with peroxidase are likewise useful in the present invention.

While it is preferred to use a highly purified form of guaiac, as described herein, it is also apparent that other organic compounds which will form colored oxidation products in the presence of oxygen released from peroxide may be used. Since this is an oral test it is, of course, important to use an organic compound or dye which is essentially nontoxic under the conditions of this test. Benzidine, ortholidine, dianisidine, phenylene diamine and 2,7-diaminofluorine dihydrochloride are representative examples.

In the foregoing discussion of this theory of the reactions involved in this invention, reference was made to the reaction involving lactic dehydrogenase. Thus, when sodium pyruvate is added as the invention contemplates, the reaction is forced in the direction of the noninhibiting DPN. It has also been found that malic dehydrogenase (which also occurs in saliva) has much the same effect as lactic dehydrogenase on DPNH. In the case of malic dehydrogenase, however, this invention contemplates the addition of oxaloacetic acid in the place of sodium pyruvate. Hence, in some instances it may be desirable to add both sodium pyruvate and oxaloacetic acid to the test tape for best response.

While the foregoing test method and test tape are obviously of primary importance to the human female, it is apparent that the test is applicable to other female animals, and can be of considerable importance. The response of the test implement may also be demonstrated by contacting another closely related body fluid, namely, cervical mucous, with the test implement.

The foregoing invention has been described in detail, but it will be apparent to those skilled in the art that certain substitutions may be made among the ingredients employed herein without departing from the spirit of the invention. All such substitutions are considered to be included herein, provided they fall within the scope of the appended claims.

I claim as my invention:

1. A test implement useful in detecting an increase in the peroxidase activity which is coincident with the fertile period of the female, which comprises a bibulous material impregnated with (a) a mannitol-peroxide complex, (b) an essentially nontoxic organic indicator, which forms a colored oxidation product in the presence of oxygen released from peroxide, and (c) sodium pyruvate.

2. A test implement according to claim 1 in which the indicator is guaiaconic acid.

References Cited

UNITED STATES PATENTS 3,087,794 4/1963 Free et al. ____ 195—103.5 XR
3,406,015 10/1968 Foster _____ 23—230

OTHER REFERENCES

Hunting, W. M., et al.: Oral Chem. 31, #1, January 1959, pp. 143, 144.

MORRIS O. WOLK, Primary Examiner

R. M. REESE, Assistant Examiner

U.S. Cl. X.R.

23—230, 253; 195—103.5